F. KRONENBERGER.
BUTTER SUBSTITUTE AND PROCESS OF MAKING THE SAME.
APPLICATION FILED JUNE 8, 1910.
1,024,009.
Patented Apr. 23, 1912.
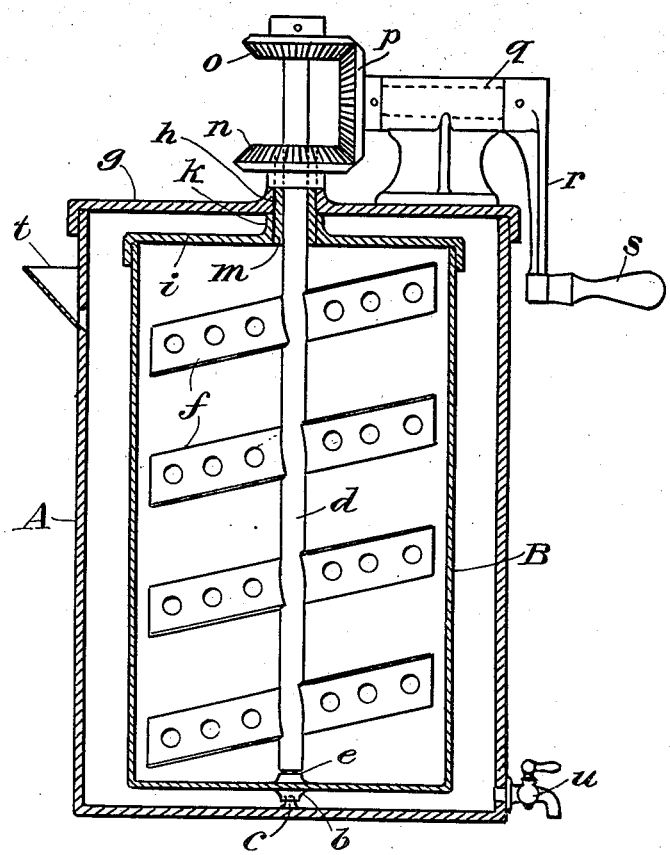
WITNESSES
Robert Head
M. C. Powell
INVENTOR
Ferdinand Kronenberger
BY
Griffin & Bernhard
ATTORNEYS

UNITED STATES PATENT OFFICE.

FERDINAND KRONENBERGER, OF CORONA, NEW YORK, ASSIGNOR TO THE ALLADIN MANUFACTURING COMPANY, OF BROOKLYN, NEW YORK, A CORPORATION OF NEW YORK.

BUTTER SUBSTITUTE AND PROCESS OF MAKING THE SAME.

1,024,009.   Specification of Letters Patent.   Patented Apr. 23, 1912.

Application filed June 8, 1910. Serial No. 565,744.

*To all whom it may concern:*

Be it known that I, FERDINAND KRONENBERGER, a citizen of the United States, residing in Corona, Long Island, county of Queens, and State of New York, have invented a certain new and useful Butter Substitute and Process of Making the Same, of which the following is a specification.

This invention is a process of combining or emulsifying a suitable lacteal fluid, preferably fresh full milk, though I may also use fresh cream or evaporated unsweetened milk, or any mixture of the foregoing products, with butter, oleomargarin, or other appropriate fat or oil, whereby a solid permanent and homogeneous butter product is obtained.

In effecting the combination specified, I employ a suitable emulsifying agent, and have discovered that gelatin, or its equivalent, is particularly adapted for this purpose.

I am aware that attempts have heretofore been made to incorporate milk and butter in such manner as to produce a permanent emulsion, but the product thus produced, so far as I am aware, will not remain smooth and tenacious, but has a tendency to crumble or crystallize, with more or less separation of milk, after the product has stood for a day or so. The novel product resulting from my process, however, remains smooth and firm, and without any separation of milk, due to the fact, I believe, of the powerful emulsifying properties and general physical mechanical characteristics of the gelatin employed.

In the accompanying drawing I have illustrated one type of apparatus wherein my invention may be practised, but it will be understood that the process described may be carried out in various forms of apparatus, and, in a broad aspect, is not dependent on any particular form of apparatus.

Referring to the drawing, A designates an outer receptacle, adapted to contain a cooling agent, and B an inner receptacle adapted to contain the materials to be emulsified. The inner receptacle is adapted to be rotated, and for this purpose is provided near its bottom with a pin, $b$, adapted to be housed or supported in a suitable bearing, $c$. The inner receptacle, B, is provided with a suitable stirrer or dasher consisting of an upright rod or shaft, $d$, the lower end of which is adapted to rotate in a bearing, $e$, on the interior of said receptacle. Secured to shaft, $d$, are vanes or stirrers, $f$, preferably perforated as shown. Outer receptacle, A, has a cover, $g$, which may be secured thereto in any approved manner, said cover being provided with a central opening, $h$, and inner receptacle, B, has a cover, $i$, provided with a hub, $k$, having an opening, $l$, the shaft, $d$, extending through the opening, $h$, in cover, $g$, and the corresponding opening, $l$, in hub, $k$. Keyed to hub, $k$, is a hollow sleeve, $m$, and secured to the top of said sleeve is a gear, $n$, so that when said gear rotates it carries sleeve, $m$, and cover, $i$, with it. To the top of shaft, $d$, is secured a gear wheel, $o$, said gear wheels, $n$, and $o$, being adapted to be driven by pinion, $p$, through the medium of a shaft, $q$, adapted to be rotated by crank, $r$, provided with a handle, $s$. It will thus be observed that when pinion, $p$, is rotated, the gear, $o$, is revolved in a certain direction carrying with it the shaft, $d$, and vanes, $f$, whereas the gear, $n$, is simultaneously rotated in the opposite direction carrying with it the sleeve, $m$, cover, $i$, and receptacle, B, to which said cover is fixedly secured when the apparatus is being operated. Outer receptacle, A, is provided with a liquid receiving inlet, $t$, and a draw off cock, $u$.

It will be observed from the description of the apparatus that covers, $i$ and $g$, together with the dasher and operating mechanism, may be removed from other parts of the apparatus so as to afford access to receptacles, A and B.

I will now describe one way of practically carrying out my novel process, but it will be understood that the same may be varied as to details, as well as in the manner heretofore specified, without departing from the spirit of the invention. To one pint of fresh full milk add a heaping teaspoonful of gelatin and dissolve the same therein, preferably by heating the mixture gradually to a point above 90° Fahrenheit, but below the boiling point of milk, this operation usually requiring from five to ten minutes. The heated mixture is then placed in inner receptacle, B, and about one pound of butter, or other suitable fat, added thereto. The mixture is then stirred a sufficient time to melt the butter, whereupon cold water, ranging in temperature between 80° Fahrenheit and 32° Fahrenheit, but preferably at the normal temperature of the atmosphere, is introduced into outer receptacle, A, and the apparatus operated until the mixture becomes cool and homogeneous. It may then be removed from the receptacle, B, and molded, or otherwise worked, as desired. It will be understood that salt, coloring matter, or other ingredients usually employed in the manufacture of butter may be introduced into the product at the proper stage, usually before the fat is added to the mixture of the milk and gelatin.

Having thus fully described the invention, what I claim as new, and desire to secure by Letters Patent is:

1. In the art of making butter substitutes, the process which consists in dissolving gelatin in a lacteal fluid and emulsifying this mixture with a suitable fat.

2. The process of making a butter substitute which consists in dissolving gelatin in milk, heating the mixture, dissolving a suitable fat therein, then stirring and cooling the combined ingredients.

3. The process of making a butter substitute which consists in heating milk, adding gelatin thereto, adding butter to the heated mixture, and then stirring the resulting product while allowing it to cool.

4. The process of making a butter substitute which consists in heating milk, dissolving gelatin in the hot milk, then adding butter to the mixture of hot milk and gelatin whereby the latter is melted, and then quickly cooling the mixture while stirring the same.

5. The herein described substantially solid butter substitute consisting of a lacteal fluid, gelatin and a suitable fat.

6. The herein described substantially solid butter substitute consisting of milk, a gelatinous substance, and butter.

7. The herein described substantially solid food substitute consisting of milk, gelatin, and butter, emulsified into a homogeneous solid mass.

8. The process of making a butter substitute which consists in mixing gelatin with milk, heating the mixture, adding butter thereto, and then stirring and cooling the combined ingredients whereby a complete substantially solid emulsion is produced.

In testimony whereof I have signed my name to this specification in the presence of two subscribing witnesses.

FERDINAND KRONENBERGER.

Witnesses:
H. I. BERNHARD,
J. FRANK MOTHERSHEAD.